UNITED STATES PATENT OFFICE.

ALEXANDER G. BELL, OF WASHINGTON, DISTRICT OF COLUMBIA, AND SUMNER TAINTER, OF WATERTOWN, MASSACHUSETTS; SAID BELL ASSIGNOR TO AMERICAN BELL TELEPHONE COMPANY.

PROCESS OF TREATING SELENIUM TO INCREASE ITS ELECTRIC CONDUCTIVITY.

SPECIFICATION forming part of Letters Patent No. 235,616, dated December 21, 1880.

Application filed August 28, 1880. (No specimens.)

*To all whom it may concern:*

Be it known that we, ALEXANDER GRAHAM BELL, of Washington, District of Columbia, and SUMNER TAINTER, of Watertown, county of Middlesex, State of Massachusetts, have invented an Improvement in Process of Treating Selenium, of which the following description is a specification.

Our invention relates to a process of treating selenium to render it suitable for use in apparatus containing selenium as a portion of an electric circuit; and it consists in a method of preparing or annealing selenium to give it the desired properties of electric conductivity affected by the action of rays from the sun or other radiant body.

In an application of A. G. Bell for Letters Patent, filed August 28, 1880, an apparatus for transmitting sound or producing variations in an electric circuit by the varying action of rays from the sun or other radiant bodies was described, containing an instrument in an electric circuit, the resistance of which is varied in accordance with variations in the active force of the said rays falling on the said instrument, and selenium was mentioned as a suitable substance to be affected by such rays, and a simple instrument containing selenium properly arranged was therein described.

Selenium, as ordinarily found in the market and in the state or condition assumed by it when solidified in the ordinary manner from a molten state, is found to be of extremely high resistance to an electric current, and only slightly sensitive to or affected by rays from the sun or similar source falling upon it; but experiments have been described in which selenium formed a part of an electric circuit, and its resistance is varied by the action of rays of light falling upon it.

We are not aware of any existing process by which selenium may be conveniently and rapidly treated to give it the desired properties, and the published descriptions have disclosed only a long and apparently uncertain process of treatment by which the product obtained is not always uniform in nature, and apparently does not possess the desired properties of conductivity and sensitiveness to the action of rays in so high a degree as does the product resulting from our method of treatment.

We have discovered after a long series of experiments a process by which selenium can be conveniently brought to the desired condition, and our process is based on the discovery that the non-conducting selenium that has cooled rapidly from a state of fusion, and which has a black color and lustrous surface, undergoes, when its temperature is gradually raised, a structural or molecular change when the temperature reaches a certain point. This point varies between 100° and 150° centigrade, according to the nature of the selenium, and depends somewhat upon the rapidity of heating. This change is made apparent to the eye by an alteration in external appearance which accompanies it. When it is about to take place, or as it takes place, a sort of cloudiness is seen to pass over the surface, which loses its dark color and luster and assumes a color and appearance similar to tarnished lead. The electric conductivity of the selenium is at the same time suddenly increased, as may be observed by a galvanometer in circuit with the said selenium. Upon continuing to raise the temperature the conductivity also increases, as may be observed by the further deflection of the galvanometer-needle, and this increase continues until the selenium reaches a temperature of about 217° centigrade, at which it is about to fuse, but has not actually melted. If allowed to melt, it again loses its conductivity and becomes on solidifying, as before described, dark-colored and not sensitive to light. When properly cooled from the said temperature without being allowed to melt, it retains or assumes when cold the desired conductivity and sensitiveness.

Our process consists in gradually heating the selenium to be treated in an apparatus in which its surface can be readily observed, or in which its conductivity can be indicated, as by a galvanometer, or both, and just at the point when the selenium is beginning to fuse in removing the source of heat and allowing the selenium to cool. It is sometimes desirable to repeat the process.

The construction of the apparatus for heating the selenium will vary according to the size and shape of the selenium to be treated. To prepare it for use in the cells described in our other joint and individual application filed herewith, we place the instrument containing the selenium to be treated on a metal plate over a gas-flame, and at the moment the point of fusion is reached the supply of gas is cut off and the instrument allowed to cool.

We have spoken of the heating as gradual, but the entire operation of heating and cooling with these small masses of metal need occupy only a few minutes.

The proper moment for stopping the heating operation may be known by the galvanometer-needle. Its increase of deflection at that moment ceases and the amount of deflection begins to decrease. It may also very conveniently be known by observing the surface, which will become dark, lose its metallic luster, and change from a leaden color to a blackish or nearly black color.

For treating large masses of selenium a closed chamber may be used to insure that the entire mass shall be uniformly heated, and any convenient source of heat be employed. Such a chamber may be provided with windows for observation. It is necessary that the source of heat should be under perfect control, so that no further heat may be added after the temperature at which fusion begins has been reached.

A thermometer may be employed to enable the temperature to be observed, to thus warn the operator of the approach of the moment when special care is to be exercised.

It will be understood that selenium assumes the desired properties when heated to any temperature in the range between the point at which the described molecular or structural change takes place and the point of fusion; but these properties exist to the greatest extent when the upper limit of the said range is attained.

It is obvious that when the desired temperature is reached the selenium may be removed from the source of heat, instead of cutting off the supply of fuel, as described.

We claim—

1. The process of treating selenium to obtain increased electrical conductivity and sensitiveness to light by producing a structural or molecular change in said selenium through the action of heat, as set forth, then removing the heat and allowing the selenium to return to ordinary temperature, so that it retains said changed condition, substantially as described.

2. The prepared selenium having the changed molecular or structural condition described, the said selenium being distinguishable by its altered appearance, great electric conductivity, and sensitiveness to light, substantially as described.

In testimony whereof we have signed our names to this specification in the presence of two subscribing witnesses.

ALEXANDER GRAHAM BELL.
SUMNER TAINTER.

Witnesses:
JOS. P. LIVERMORE,
N. E. C. WHITNEY.